April 30, 1968  TAKESHI MASUYAMA ET AL  3,380,936
SILICON CARBIDE VARISTORS
Filed Oct. 18, 1965  3 Sheets-Sheet 1

Takeshi Masuyama
Michio Matsuoka
INVENTORS

BY Wenderoth, Lind & Ponack

ATTORNEYS

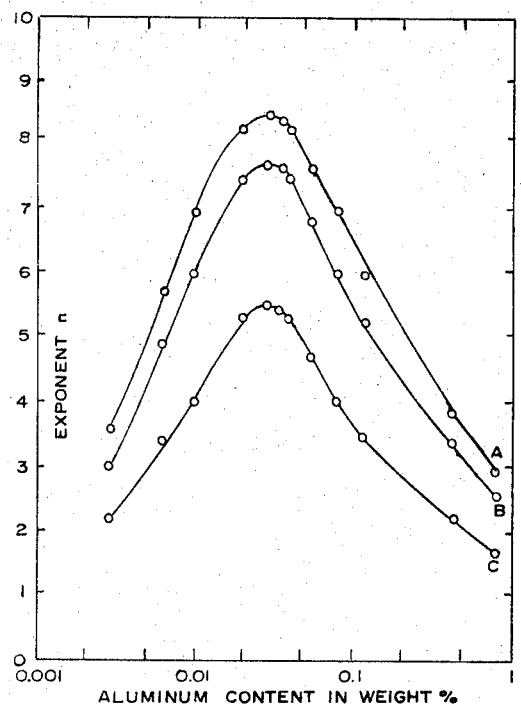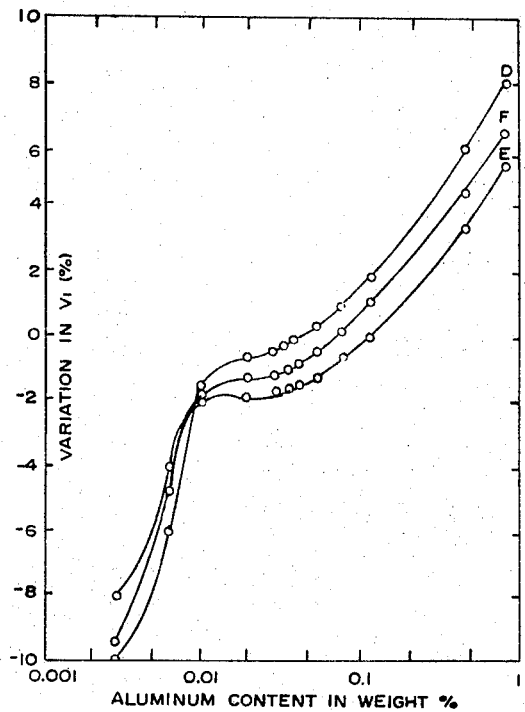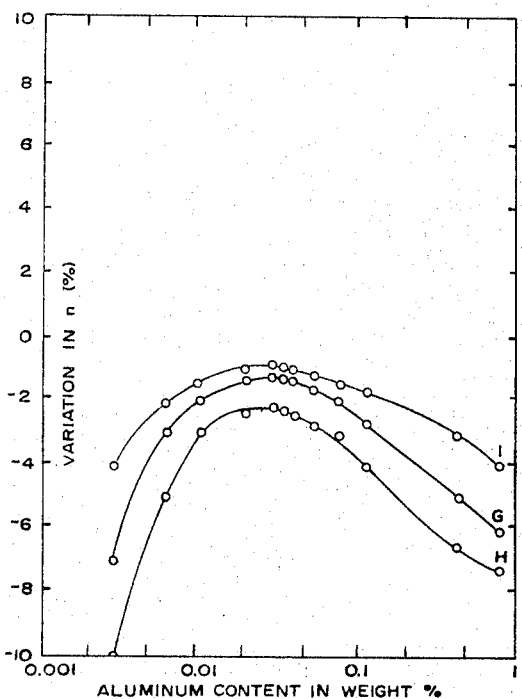

Takeshi Masuyama
Michio Matsuoka
INVENTORS

ATTORNEYS

United States Patent Office 3,380,936
Patented Apr. 30, 1968

3,380,936
SILICON CARBIDE VARISTORS
Takeshi Masuyama, Takatsuki-shi, Osaka-fu, and Michio Matsuoka, Nishinomiya-shi, Japan, assignors to Matsushita Electric Industrial Co., Ltd., Osaka, Japan
Filed Oct. 18, 1965, Ser. No. 496,939
12 Claims. (Cl. 252—516)

ABSTRACT OF THE DISCLOSURE

Silicon carbide particles adapted for a varistor provided with a high $n$ value, said silicon carbide particles comprising 0.01 to 0.08 wt. percent of aluminum and 0.005 to 0.015 wt. percent of nitrogen or 0.003 to 0.06 wt. percent of boron and 0.005 to 0.015 wt. percent of nitrogen.

This invention relates to silicon carbide varistors for use in the manufacture of electrical resistance devices and more particularly for use in the manufacture of non-ohmic resistors.

Silicon carbide varistors are ordinarily manufactured by mixing fine particles of silicon carbide with water and ceramic binder, pressing the mixture in a mold to the desired shape, and then drying and firing the pressed body. The electrical characteristics of such a varistor are expressed by the relation:

$$I = \left(\frac{V}{C}\right)^n$$

where $V$ is the voltage across the varistor, $I$ is the current flowing through the varistor, $C$ is a constant equivalent to a voltage at a given current, and $n$ is a numerical value greater than 1. The desired value of $C$ depends upon the particular use to which the varistor is to be put. It is ordinarily desirable that the value of $n$ be as large as possible since this exponent determines the degree to which the varistor departs from ohmic characteristics. The values of $C$ and $n$ depend upon the grain size of the silicon carbide, upon the amount of conductive carbon, such as graphite, and upon the composition or weight percent of binder from which the varistor is prepared. The firing temperature and ambients also have an effect on $C$ and $n$. However, the electrical characteristics of silicon carbide are predominantly bound up with the values of $C$ and $n$ of the varistor, regardless of the conditions mentioned above.

It is also important that varistors have a high stability with a load life which is defined by a test wherein the varistor is maintained at a known relative humidity at a given temperature while being subjected to an electrical load for a long period of time.

Therefore, it is a primary purpose of the present invention to provide a varistor containing improved silicon carbide and having a high value of $n$ and excellent stabilities of electrical characteristics.

Another object of the invention is to provide a varistor exhibiting a high value of $n$, for use in high electrical resistance devices.

A further object of the invention is to provide a varistor having a high value of $n$, for use in medium electrical resistance devices.

A still further object is to provide a varistor characterized by a high value of $n$, for use in low electrical resistance devices.

Other objects of the present invention will become apparent from the following detailed description when taken together with the accompanying drawings, in which:

FIG. 5 shows the relation of aluminum content vs. values of $n$;

FIGS. 6 and 7 show relations of aluminum content vs. variations in $V_1$ and $n$, respectively;

Figure 1:
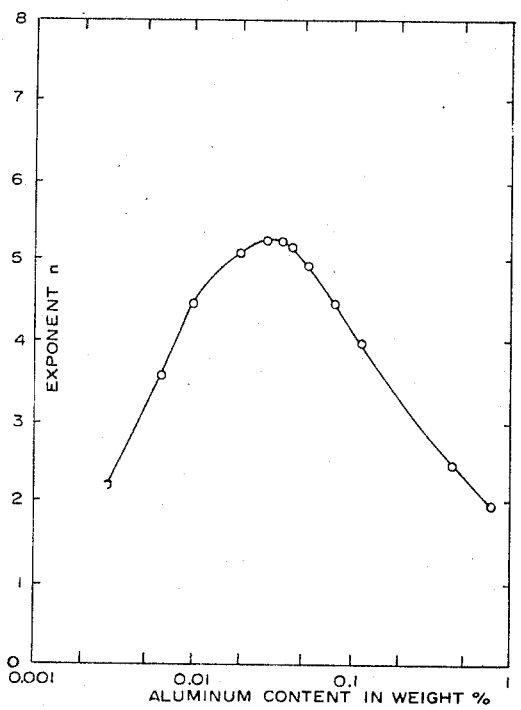
FIG. 1 shows the relation of aluminum content vs. values of $n$ for silicon carbide without binder.

Silicon carbide is manufactured by heating a mixture principally consisting of silica, such as quartz sand, and carbon, such as coke, at about 2300–2600° C. in a large furnace having a graphite heating element. The properties of the resultant silicon carbide vary with raw materials, structure of furnace and heating conditions. It is known that silicon carbide is divided into two classifications or varieties, commonly known in the trade as "black" silicon carbide and "green" silicon carbide. It is reported that the black silicon carbide usually behaves as p-type semiconductor, and the green silicon carbide as n-type semiconductor. The so-called "black" grade silicon carbide is the more common and the more impure of the two and is generally acceptable for the manufacture of abrasives, refractory products and for electrical utilities depending upon its properties. Silicon carbide available for abrasives and refractory products contains 0.09 to 0.50 weight percent of aluminum and silicon carbide for electrical utilities contains 0.25 to 0.80 weight percent of aluminum.

The so-called "green" grade of silicon carbide is prepared from the purer raw materials accompanied with salt, such as sodium chloride, in an effort to sublime the impurities in the form of chlorides, and contains less than 0.008 weight percent of aluminum. The "green" silicon carbide is not acceptable for the manufacture of varistors because it has a higher electrical resistivity and a higher temperature coefficient of electrical resistivity which are not suitable for application to varistors. A varistor is usually prepared from the "black" silicon carbide having the lower electrical resistivity and the more suitable sinterability. The varistor prepared from the "black" silicon carbide, however, has an inferior characteristic in the value of $n$.

A method of industrial manufacture of silicon carbide comprises heating a mixture of silica and commercially available coke in air, with the result that 0.005 to 0.015 weight percent of nitrogen in air dissolves into the silicon carbide. This dissolving of nitrogen, which is unavoidable in the manufacture of silicon carbide, decreases the value of $n$. It has been discovered, according to the present invention, that the undesirable effect caused by nitrogen is improved by controlling the weight percent of aluminum in the silicon carbide. The electrical characteristic of silicon carbide in n-type semiconductors is governed by dissolved nitrogen acting as a donor where the weight percent of aluminum is low. As the weight percent of aluminum increases, the electrical resistivity of silicon carbide containing 0.005 to 0.015 weight percent of nitrogen increases and is maximal at a transition point from the n-type silicon carbide caused by a partial substitution of carbon atoms by dissolved nitrogen atoms acting as donors to p-type silicon carbide caused by increasing content of substituents of aluminum atoms acting as acceptors and thereafter decreases with an increase in the content of aluminum. We have found that the value of $n$ of silicon carbide is high in the vicinity of the transition point. The content of aluminum operable for a high value of $n$ is from 0.01 to 0.08 weight percent, and a weight percent ranging from 0.02 to 0.04 is preferable. The operable or preferable content of aluminum does not vary with a variation in amount of solved nitrogen when the content is of the order of 0.005 to 0.015 weight percent.

Reference is now made to FIG. 1 wherein the relation between the value of $n$ and the content of aluminum is shown. This renders visual the results of the investigation of the $n$ value of silicon carbide, in particle size of 100 microns, having 0.005 to 0.015 weight percent of nitrogen, as a function of the content of aluminum, by the following method:

Silicon carbide without binder is packed into a ceramic tube, at the bottom of which a disk electrode of steel is fixed, and is pressed through a top electrode at a constant pressure of 400 kg./cm.² The size of the compacted silicon carbide is 4 mm. in diameter and 4.5 mm. in height. A relation between current and voltage is measured by using a DC constant current source and a vacuum tube voltmeter. The value of $n$ is calculated from the relations obtained by varying the current, and is shown in FIG. 1 where $n$ is calculated from the voltages at 0.01 and 0.1 milliampere. It will be seen that a high value of $n$ is obtained with silicon carbide containing 0.01 to 0.08 weight percent of aluminum and the highest value is obtained at a range of 0.02 to 0.04 weight percent of aluminum. This tendency does not vary with the presence of nitrogen in an amount of 0.005 to 0.015 weight percent. The desirable silicon carbide is black or greyish black in color.

As will be explained in the following examples, the same result is obtained with a varistor comprising said silicon carbide according to the present invention and ceramic binder even where there are many variations in grain size of the silicon carbide, the composition and weight percent of ceramic binder, the pressing pressure and the firing temperatures and ambients.

The aluminum may, if desired, be replaced by boron with substantially the same results. In the case of boron, its operable proportion is in the range of 0.003 to 0.06 weight percent, and a preferred proportion is in the range of 0.005 to 0.015 weight percent.

The content of aluminum in the resultant silicon carbide can be controlled by adding a desirable amount of aluminum oxide to the mixture of silica and coke as starting materials, by using impure silica which originally includes a desired amount of aluminum oxide, or by a combination of both in the manufacture of the silicon carbide.

In the case of boron, the content can be controlled by adding a desirable amount of boron oxide to the mixture of silica and coke.

Silicon carbide varistors are manufactured by the following processes. Fine particles of silicon carbide are mixed with a ceramic binder and a small amount of water. The ceramic binder is necessary for use in bonding the silicon carbide particles and is composed of any ceramic material inert to silicon carbide at high temperatures in oxidizing or non-oxidizing ambient, such as clay, pottery stone, refractory oxides and their combinations. A high amount of ceramic binder results in a high electrical resistivity of varistors and a low amount thereof produces poorly sintered varistors. The preferable proportions of the ceramic binder to silicon carbide are 10 to 50 weight percent of ceramic binder and 50 to 90 weight percent of silicon carbide.

The binder may be mixed with some amounts of conductive carbon in the form of graphite for the preparation of low resistance varistors. The preferred proportions of graphite to ceramic binder are 4 to 14 weight percent of graphite and 86 to 96 weight percent of ceramic binder. The mixture is fabricated into rods by ordinary ceramic extrusion technique if high resistance is required and pressed into disks according to an ordinary ceramic forming technique if medium or low resistance is required. The fabricated bodies are dried at 60 to 120° C. for several hours in a drier and then fired at 1000 to 1400° C. for 1 to 3 hours in a furnace. The firing ambient is an oxidizing one, such as air, for rod-type varistors of high resistance or disk-type varistors of medium resistance, and a neutral or reducing one for disk-type varistors of low resistance, which contains graphite. After firing, terminal caps and metallizing electrodes of zinc or copper are applied to rod-type varistors and disk-type varistors, respectively.

Figure 2:
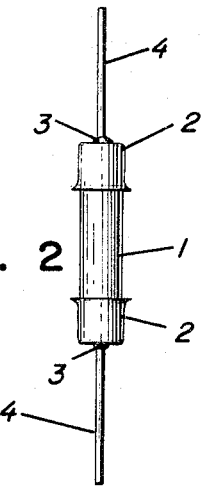
FIGS. 2 and 3 are front views of a rod-type varistor and a disk-type varistor, respectively.
Figure 3:
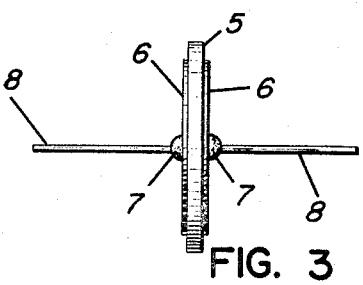

More details of constructions of the varistors are shown in FIGS. 2 and 3. In FIG. 2 representing a rod-type varistor of high electrical resistance, 1 designates a sintered body consisting of silicon carbide incorporated with aluminum and of a ceramic binder in accordance with the present invention. Terminal caps 2 which are made of tin-plated iron are applied to sintered body 1 and tin-plated copper wires 4 are soldered to terminal caps 2 by solder 3. A disk-type varistor of medium or low electrical resistance is shown in FIG. 3, wherein 5 designates a sintered body consisting of silicon carbide incorporated with aluminum and of a ceramic binder with or without graphite. Electrodes 6 of zinc or copper are metallized onto sintered body 5 by a well-known method. Tin-plated wires 8 are soldered to electrodes 6 by solder 7. Varistors are ordinarily coated with a waterproof material such as resin after electroding for prevention of the absorption of moisture. The values of C and $n$ of varistors are measured by a similar method to that of silicon carbide without binder. Usually the value of C is replaced by a voltage $V_1$, specified by a flowing current of 1 milliampere through the varistor. The value of $n$ is calculated from the relation:

$$n = \frac{\log_{10}(I_2/I_1)}{\log_{10}(V_2/V_1)}$$

where $V_1$ and $V_2$ are the voltages at the currents $I_1$ and $I_2$, respectively.

The stabilities of electrical characteristics of varistors are evaluated by the following method. Varistors are placed in a chamber maintained at a constant temperature of 70° C. and a constant relative humidity of 60% and have applied thereto an electrical load of a suitable amount of wattage ranging from 0.25 to 10 watts. After several cycles, samples are taken out from the chamber. The values of $V_1$ and $n$ are measured and compared with the original values for evaluation of stabilities of electrical characteristics.

The following examples are given by way of illustration and should not be construed as limitative.

Example 1

Rod-type varistors of high resistance are made by the method hereinbefore outlined. Test conditions are shown in Table 1:

TABLE 1

| | |
|---|---|
| Silicon carbide (150 mesh) | 75 wt. percent. |
| Binder | 25 wt. percent. |
| Water | 20 wt. percent of binder. |
| Pressure of extrusion | 500 kg./cm.² |
| Dimension of rod | 4 mm. in diameter and 10 mm. in distance between terminal caps. |
| Firing | 1000–1400° C. for 1 hour in air. |

Figure 4:
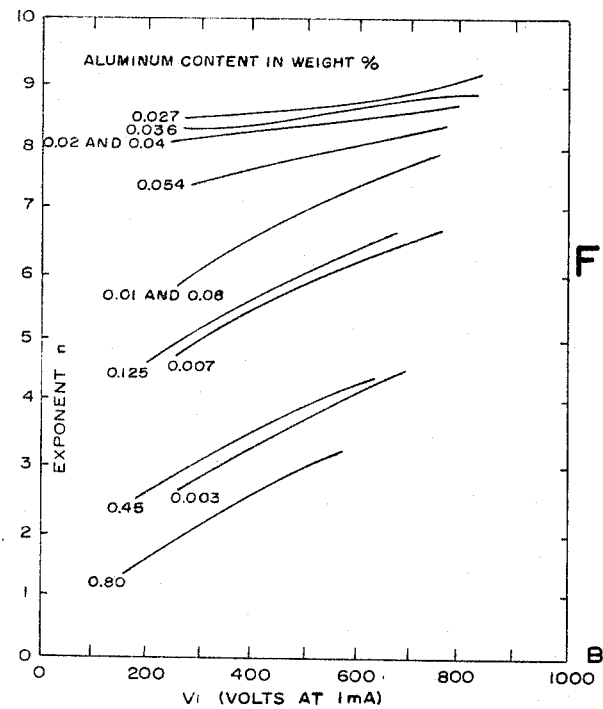
FIG. 4 shows the relation of values of $V_1$ defined as voltage at 1 milliampere vs. values of $n$.

The contents of aluminum of silicon carbide used for these tests are 0.003, 0.007, 0.01, 0.02, 0.027, 0.036, 0.04, 0.054, 0.08, 0.125, 0.45, 0.80 wt. percent and each of them contains 0.005 to 0.015 wt. percent of nitrogen. The binder used is composed of clay, pottery stone and a small amount of flux. The total chemical ingredients in the binder are as follows: 72% $SiO_2$, 18% $Al_2O_3$, 0.50% $Fe_2O_3$, 1.0% CaO, 1.5% MgO, 1.5% $B_2O_3$, 1.0% $Na_2O$, 1.0% $K_2O$ and 3.5% ignition loss by weight. The extruded bodies are dried, fired at various temperatures from 1000 to 1400° C. for 1 hour in air and combined with terminal caps. The values of $V_1$ and $n$ as defined in this specification decrease with an increase in the firing temperature. The $V_1-n$ curves of 12 samples are shown as a function of firing temperature in FIG. 4, where the values of $n$ at $V_1=500$ volts are interpolated and then plotted against the content of aluminum of the silicon carbide. The results for rod-type varistors are represented by curve A in FIG. 5. It is clear that the value of $n$ is large at the range of 0.01 to 0.08 wt. percent of aluminum and that the preferable content is the range of 0.02 to 0.04 wt. percent.

Example 2

Similar tests are carried out with the disk-type varistors of medium resistance made by the method hereinbefore outlined. Test conditions are shown in Table 2:

TABLE 2

| | |
|---|---|
| Silicon carbide (150 mesh) | 75 wt. percent. |
| Binder | 25 wt. percent. |
| Water | 20 wt. percent of cinder. |
| Pressure of compacting | 700 kg./cm.² |
| Dimension of disk | 20 mm. in diameter and 1 mm. in thickness. |
| Firing | 1000–1400° C. for 1 hour in air. |

The $V_1-n$ curves are obtained in a similar manner to that of the preceding example. The values of $n$ at $V_1=100$ volts are interpolated and then plotted against the content of aluminum of the silicon carbide. These data are represented by curve B in FIG. 5. It will be clear that the results of Example 2 are essentially the same as those of Example 1.

Example 3

Disk-type varistors of low resistance are prepared under the conditions set forth in Table 3 in a similar way to that precedingly described in this specification.

TABLE 3

| | |
|---|---|
| Silicon carbide (150 mesh) | 75 wt. percent. |
| Binder (contains graphite) | 25 wt. percent. |
| Graphite | 4–14 wt. percent of binder. |
| Water | 20 wt. percent of binder. |
| Pressure of compacting | 700 kg./cm.² |
| Dimension of disk | 20 mm. in diameter and 1 mm. in thickness. |
| Firing | 1250° C. for 1 hour in nitrogen. |

The values of $V_1$ and $n$ decrease with an increase in the amount of graphite in binder. In the same manner, $V_1-n$ curves are obtained. The values of $n$ at $V_1=5$ volts are interpolated and then plotted against the content of aluminum of the silicon carbide.

These data are represented by curve C in FIG. 5. It is also clear that the high value of $n$ of the varistors is attained by using silicon carbide containing 0.01 to 0.08 wt. percent, preferably 0.02 to 0.04 wt. percent of aluminum.

Example 4

The effect of particle size of the silicon carbide on the values of $V_1$ and $n$ is evaluated under the conditions set forth in Table 4.

TABLE 4

| | |
|---|---|
| Silicon carbide (100, 150, 220 meshes) | 75 wt. percent. |
| Binder | 25 wt. percent. |
| Water | 20 wt. percent of binder. |
| Pressure of extrusion | 500 kg./cm.² |
| Dimension of rod | 4 mm. in diameter and 10 mm. in distance between terminal caps. |
| Firing | 1000–1400° C. for 1 hour in air. |

The results are summarized in Table 5, where the values of $n$ at $V_1=500$ volts are shown with regard to the content of aluminum and the particle size.

According to Table 5, it will be clear that although the value of $n$ increases with an increase in the particle size of the silicon carbide, the effect of solved aluminum in the silicon carbide does not vary with the shape of the varistor, the amount of graphite and other conditions.

TABLE 5

| Particle Size (average diameter) | Aluminum Content in wt. Percent | | | | | | | | | | | |
|---|---|---|---|---|---|---|---|---|---|---|---|---|
| | 0.003 | 0.007 | 0.01 | 0.02 | 0.027 | 0.036 | 0.04 | 0.054 | 0.08 | 0.125 | 0.45 | 0.80 |
| 100 mesh (150 microns) | 4.2 | 6.3 | 7.6 | 8.9 | 9.2 | 9.1 | 8.9 | 8.4 | 7.6 | 6.5 | 4.3 | 3.4 |
| 150 mesh (100 microns) | 3.7 | 5.8 | 7.0 | 8.3 | 8.5 | 8.4 | 8.3 | 7.8 | 7.0 | 6.0 | 3.9 | 3.0 |
| 220 mesh (70 microns) | 3.2 | 5.2 | 6.4 | 7.6 | 7.8 | 7.7 | 7.6 | 7.2 | 6.4 | 5.4 | 3.4 | 2.5 |

Example 5

The effect of the mixing ratio of silicon carbide to binder on the values of $V_1$ and $n$ is evaluated under the test conditions shown in Table 6.

TABLE 6

| | |
|---|---|
| Silicon carbide (150 mesh) | 50, 60, 75, 90 wt. percent. |
| Binder | 50, 40, 25, 10 wt. percent. |
| Water | 20 wt. percent of binder. |
| Pressure of extrusion | 500 kg./cm.² |
| Dimension of rod | 4 mm. in diameter and 10 mm. distance between terminal caps. |
| Firing | 1000–1400° C. for 1 hour in air. |

The results are summarized in Table 7, where the values of $n$ at $V_1=500$ volts are shown with respect to the content of aluminum and the mixing ratio of silicon carbide to binder. According to Table 7, the effect of solved aluminum in silicon carbide does not vary with the shape of varistor, the amount of graphite and other conditions, although there is an optimum for the mixing of silicon carbide to binder.

TABLE 7

| Silicon Carbide and Binder Contents in wt. Percent | Aluminum Content in wt. Percent | | | | | | | | | | | |
|---|---|---|---|---|---|---|---|---|---|---|---|---|
| | 0.003 | 0.007 | 0.01 | 0.02 | 0.027 | 0.036 | 0.04 | 0.054 | 0.08 | 0.125 | 0.45 | 0.80 |
| Silicon Carbide 50% / Binder 50% | 3.1 | 5.0 | 6.1 | 7.2 | 7.4 | 7.3 | 7.2 | 6.7 | 6.1 | 5.2 | 3.3 | 2.5 |
| Silicon Carbide 60% / Binder 40% | 3.4 | 5.3 | 6.4 | 7.6 | 7.9 | 7.8 | 7.6 | 7.1 | 6.4 | 5.5 | 3.5 | 2.7 |
| Silicon Carbide 75% / Binder 25% | 3.7 | 5.8 | 7.0 | 8.3 | 8.5 | 8.4 | 8.3 | 7.8 | 7.0 | 6.0 | 3.9 | 3.0 |
| Silicon Carbide 90% / Binder 10% | 3.0 | 4.0 | 5.9 | 7.1 | 7.3 | 7.2 | 7.1 | 6.6 | 5.9 | 5.0 | 3.2 | 2.4 |

Example 6

The stabilities of electrical characteristics of varsitors are evaluated with the samples of Examples 1, 2 and 3. Testing conditions are shown in Table 8.

TABLE 8

| | |
|---|---|
| Ambient temperature | 60%. |
| Relative humidity | 70° C. |
| Electrical load | DC 1 watt. |
| Test period | 1000 hours. |

Samples are chosen from the groups having nearly the same values of $V_1$ as in Examples 1, 2 and 3. Load life test is performed in a chamber maintained at a constant temperature of 70° C. and a constant relative humidity of 60%. Variations in values of $V_1$ and $n$ are measured and represented as a function of the content of aluminum in FIG. 6, wherein curves D, E and F show the results obtained with the samples of Examples 1, 2 and 3, respectively. The relations between the variation in the value of $n$ and the content of aluminum are shown in FIG. 7, where curves G, H and I show the results obtained with the samples of Examples 1, 2 and 3, respectively. It is clear that the stabilities are excellent for the varistors composed of silicon carbide which contains aluminum at the range of 0.01 to 0.08 wt. percent.

Example 7

The contents of boron in silicon carbide used for this test are 0.001, 0.003, 0.005, 0.01, 0.015, 0.04, 0.06, 0.15, 0.30 wt. percent and each of them contains 0.005 to 0.015 wt. percent of nitrogen.

Figure 8:
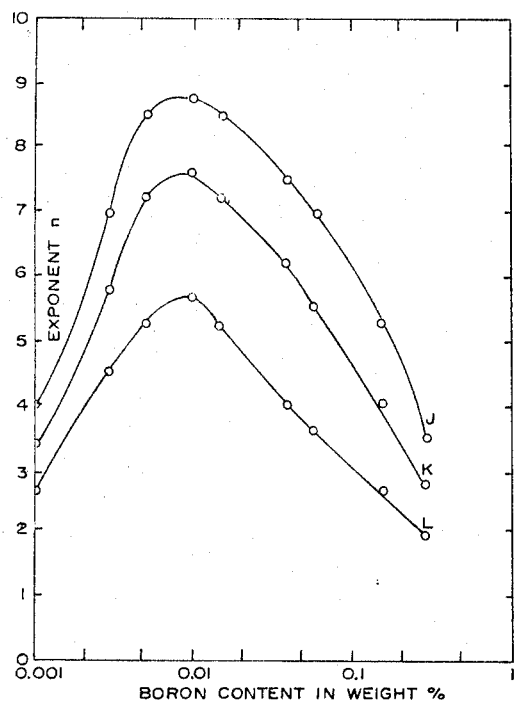
FIG. 8 shows relation of boron content vs. values of $n$.

Test conditions are exactly the same as those of Examples 1, 2 and 3. The results are shown in FIG. 8, where curves J, K and L show the relations between the value of $n$ and the content of boron for varistors of high resistance, medium resistance and low resistance, respectively. It is clear that the value of $n$ is large at the range of 0.003 to 0.06 wt. percent of boron and preferable content is in the range of 0.005 to 0.015 wt. percent.

Example 8

The stabilities of electrical characteristics of varsitors are also evaluated by using silicon carbide incorporated with boron.

Figure 9:
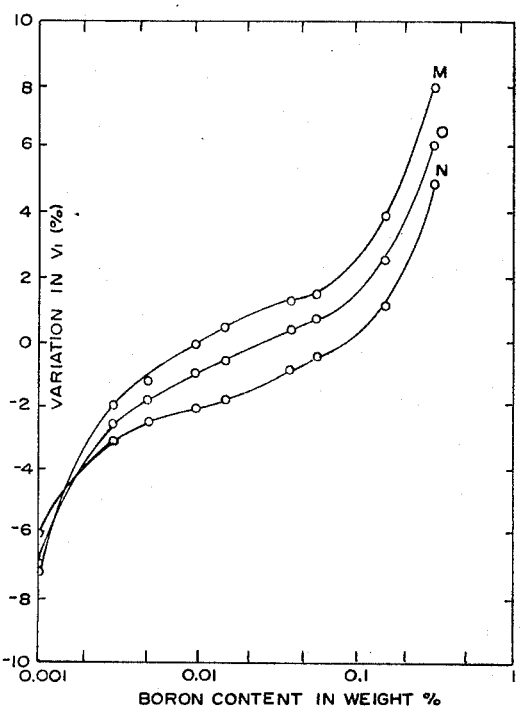
FIGS. 9 and 10 show relations of boron content vs. variations in $V_1$ and $n$, respectively.

Test conditions are exactly the same as those of Example 6. The variation in the value of $V_1$ is shown in FIG. 9, where curves M, N and O show the results for varistors of high resistance, medium resistance and low resistance, respectively.

Figure 10:
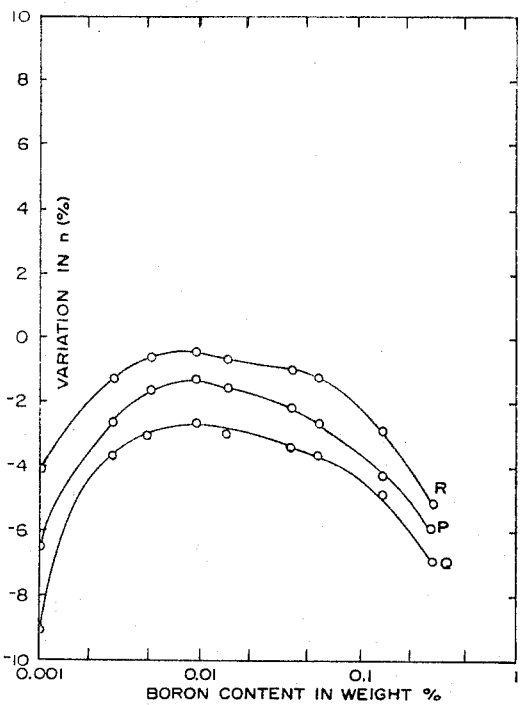

The variation in the values of $n$ is shown in FIG. 10, where curves P, Q and R show results for varsitors of high resistance, medium resistance and low resistance, respectively. It is clear that the stabilities are excellent for the varistors composed of silicon carbide which contains boron at the range of 0.003 to 0.06 wt. percent.

As mentioned above, a varistor having a high value of $n$ and excellent stabilities of electrical characteristics can be obtained by controlling the contents of aluminum or boron in the silicon carbide. Such improved silicon carbide varistors have excellent utilities in many kinds of applications.

Changes may be made with the scope and spirit of the claims and some of the improvements may be used without others.

What is claimed is:

1. A composition useful as a component of varistors and consisting essentially of silicon carbide, 0.01 to 0.08 wt. percent of aluminum and 0.005 to 0.015 wt. percent of nitrogen.

2. A composition useful as a component of varistors and consisting essentially of silicon carbide, 0.02 to 0.04 wt. percent of aluminum and 0.005 to 0.015 wt. percent of nitrogen.

3. A composition useful as a component of varistors and consisting essentially of silicon carbide 0.003 to 0.06 wt. percent of boron and 0.005 to 0.015 wt. percent of nitrogen.

4. A composition useful as a component of varistors and consisting essentially of silicon carbide, 0.005 to 0.015 wt. percent of boron and 0.005 to 0.015 wt. percent of nitrogen.

5. Varistor composition consisting essentially of 50 to 90 wt. percent of silicon carbide composition and 10 to 50 wt. percent of ceramic binder, the silicon carbide composition consisting essentially of silicon carbide, 0.01 to 0.08 wt. percent of aluminum and 0.005 to 0.015 wt. percent of nitrogen.

6. Varistor composition consisting essentially of 50 to 90 wt. percent of silicon carbide composition and 10 to 50 wt. percent of ceramic binder, the silicon carbide composition consisting essentially of silicon carbide, 0.02 to 0.04 wt. percent of aluminum and 0.005 to 0.015 wt. percent of nitrogen.

7. Varistor composition consisting essentially of 50 to 90 wt. percent of silicon carbide composition and 10 to 50 wt. percent of ceramic binder, the silicon carbide, composition consisting essentially of silicon carbide, 0.003 to 0.06 wt. percent of boron and 0.005 to 0.015 wt. percent of nitrogen.

8. Varistor composition consisting essentially of 50 to 90 wt. percent of silicon carbide composition and 10 to 50 wt. percent of ceramic binder, the silicon carbide composition consisting essentially of silicon carbide, 0.005 to 0.015 wt. percent of boron and 0.005 to 0.015 wt. percent of nitrogen.

9. Varistor composition essentially consisting of 50 to 90 wt. percent of silicon carbide composition and 10 to 50 wt. perecnt of ceramic binder comprising 4 to 14 wt. percent of graphite, the silicon carbon composition consisting essentially of silicon carbide, 0.01 to 0.08 wt. percent of aluminum and 0.005 to 0.015 wt. percent of nitrogen.

10. Varistor composition essentially consisting of 50 to 90 wt. percent of silicon carbide composition and 10 to 50 wt. percent of ceramic binder comprising 4 to 14 wt. percent of graphite, the silicon carbide composition consisting essentially of silicon carbide, 0.02 to 0.04 wt. percent of aluminum and 0.005 to 0.015 wt. percent of nitrogen.

11. Varistor composition essentially consisting of 50 to 90 wt. percent of silicon carbide composition and 10 to 50 wt. percent of ceramic binder comprising 4 to 14 wt. percent of graphite, the silicon carbide composition consisting essentially of silicon carbide, 0.003 to 0.06 wt. percent of boron and 0.005 to 0.015 wt. percent of nitrogen.

12. Varistor composition essentially consisting of 50 to 90 wt. percent of silicon carbide composition and 10 to 50 wt. percent of ceramic binder comprising 4 to 14 wt. percent of graphite, the silicon carbide composition consisting essentially of silicon carbide, 0.005 to 0.015 wt. percent of boron and 0.005 to 0.015 wt. percent of nitrogen.

References Cited

UNITED STATES PATENTS

| 2,143,414 | 1/1939 | Grisdale | 252—504 |
| 2,205,308 | 6/1940 | Pirani | 252—504 |

OTHER REFERENCES

Lely et al: "Electrical Properties of Hexagonal SiC Doped with N, B or Al"; Semiconductor and Phosphors, Proc. Intern. Collog., 1956 (Published 1958), pages 525–33.

LEON D. ROSDOL, *Primary Examiner.*

MURRAY KATZ, *Examiner.*

J. D. WELSH, *Assistant Examiner.*